UNITED STATES PATENT OFFICE.

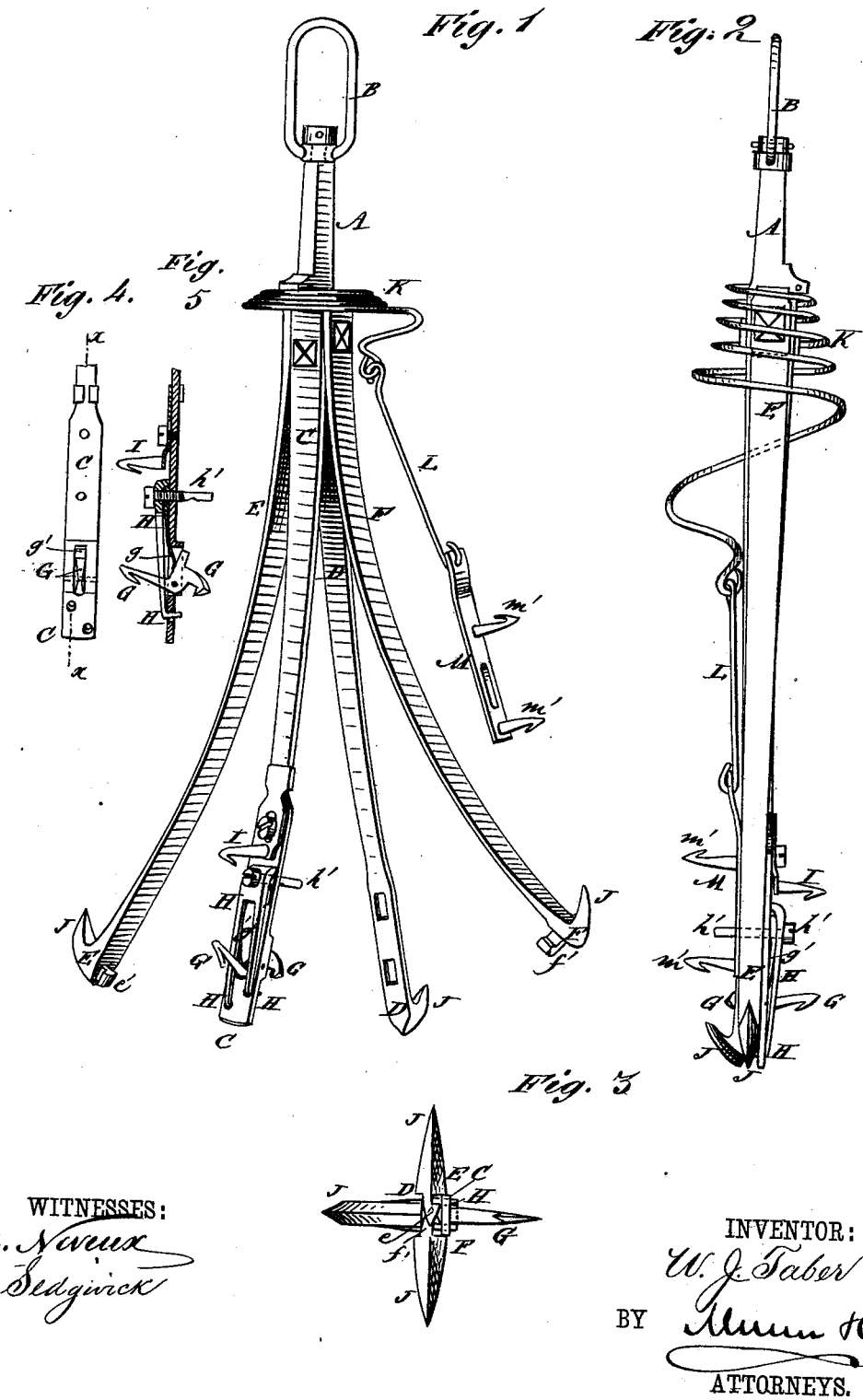

WILLIAM J. TABER, OF LOOKOUT STATION, WYOMING TERRITORY.

IMPROVEMENT IN ANIMAL-TRAPS.

Specification forming part of Letters Patent No. 219,998, dated September 23, 1879; application filed April 30, 1879.

*To all whom it may concern:*

Be it known that I, WILLIAM JASPER TABER, of Lookout Station, Wyoming Territory, have invented a new and useful Improvement in Animal-Traps, of which the following is a specification.

Figure 1 is a perspective view of my improved trap open. Fig. 2 is a side view of the same shut or set. Fig. 3 is an end view of the same. Fig. 4 is a side view of the end of the spring-bar to which the trigger is pivoted. Fig. 5 is a longitudinal section of the same, taken through the line $x$ $x$, Fig. 4.

Similar letters of reference indicate corresponding parts.

The object of this invention is to furnish an improved trap for catching bears, wolves, and other animals, which shall be simple in construction and reliable in use.

The invention consists in the combination of the four curved spring-bars provided with the hooks, the trigger, and the catches with each other and with the shank; and in the combination of the spiral spring, the connecting-rod, and the plate provided with the barbed hooks with the shank, the curved spring-bars, and the projecting screw, as hereinafter fully described.

A represents a square shank, to the end of which is swiveled a ring or loop, B, to receive the chain for securing or hanging the trap. To the sides of the forward end of the shank A are bolted the ends of four outwardly-curved spring-bars, C D E F. In a slot in the forward end of the spring-bar C is pivoted a trigger, G, upon the inner end of which is formed a catch to pass through a short slot in the end of the opposite spring-bar, D, to fasten the two spring-bars C D together.

The trigger G is held forward to catch upon and hold the spring-bar D by a small spring, $g'$, attached to the said spring-bar C, and which presses against a shoulder of the said trigger G. The other or outer end of the trigger G is barbed to enter and hold the bait. To the outer side of the spring-bar C is attached the shank of a forked spring, H, the arms of which are made of different lengths, are bent inward at right angles, and pass through holes in the said spring-bar C, to serve as catches to engage with the shoulders of the catches $e'$ $f'$ of the spring-bars E F and fasten the said spring-bars in place when pressed together. The catches $e'$ $f'$ are formed upon the inner sides of the ends of the spring-bars E F, and are beveled so as to push back and pass the spring-catches H when the said bars E F are pressed together.

Upon the spring-bar C, at the base of the spring H, is placed a barbed hook, I, the base or shank of which is bent back at right angles to rest upon the bar C, is slotted longitudinally to receive the screw by which it is secured to the said bar C, and its edges are bent around the edges of the said bar C, to prevent it from turning upon its fastening-screw. Upon the outer sides of the ends of the spring-bars D E F are formed lance-shaped hooks J, as shown in Figs. 1, 2, and 3. To the shank A is attached the end of a spiral spring, K, which is coiled around the said shank, and its other end is connected by a short rod, L, with the end of the plate M. To the outer side of the plate M are attached two barbed pins or hooks, $m'$, to receive the bait. The plate M has a short slot formed in it between the hooks $m'$ to receive the projecting end of the screw $h'$, that fastens the spring H to the spring-bar C. The outer side of the screw $h'$ has a slight recess formed in it to prevent the bait-plate M from slipping off.

In setting the trap, the outer ends of the spring-bars C D are pressed together until the trigger G passes through and catches upon the spring-bar D. The outer ends of the spring-bars E F are then pressed inward, either at the same time or separately, until their catches $e'$ $f'$ catch upon the catches H. The bait-plate M is then drawn outward and hooked upon the screw $h'$, and the bait is attached to the barbed hooks G I $m'$ $m'$.

With this construction, when the animal takes the bait into his mouth, a slight pull upon it disengages the trigger G, and the ends of the spring-bars C D E F spring outward, thrusting the hooks J into the sides of his mouth, holding him securely, and at the same time cutting his mouth so that he soon bleeds to death. At the same time the plate M is released, and the spring K withdraws it and the bait, so that the bait will not obstruct the action of the spring-bars C D E F.

The trap is hung upon a tree, stake, or bush, so that the bait will be within reach of the animal to be caught. Dogs, wolves, bears, and many other animals will sieze a piece of flesh with their jaws and bolt it down their throats in a moment.

I have been trapping in the mountains for twelve years, and thought a long time how to construct a suitable trap. After embodying my ideas in two traps corresponding to that on which I ask a patent, I experimented with them until I had caught two coyotes in one and eight in the other. In all these cases the animals had bled to death when I reached the trap, an artery in the mouth having possibly been severed.

I am aware that it is not new to use a hanging trap with barbed jaws that spring out laterally as soon as the trap is sprung; but

What I claim is—

The bait-holder M m', connected by rod L and coiled spring K with the bar A, in combination with the barbed spring-bars, as shown and described, whereby the bait is jerked out of the animal's mouth as soon as the trap is sprung.

WILLIAM JASPER TABER.

Witnesses:
 JOHN PARISH,
 COLUMBUS C. HAYS.